June 14, 1949. J. H. KROOSS 2,473,102
COUPLING FOR BRITTLE PIPES
Filed Feb. 6, 1947 2 Sheets-Sheet 1
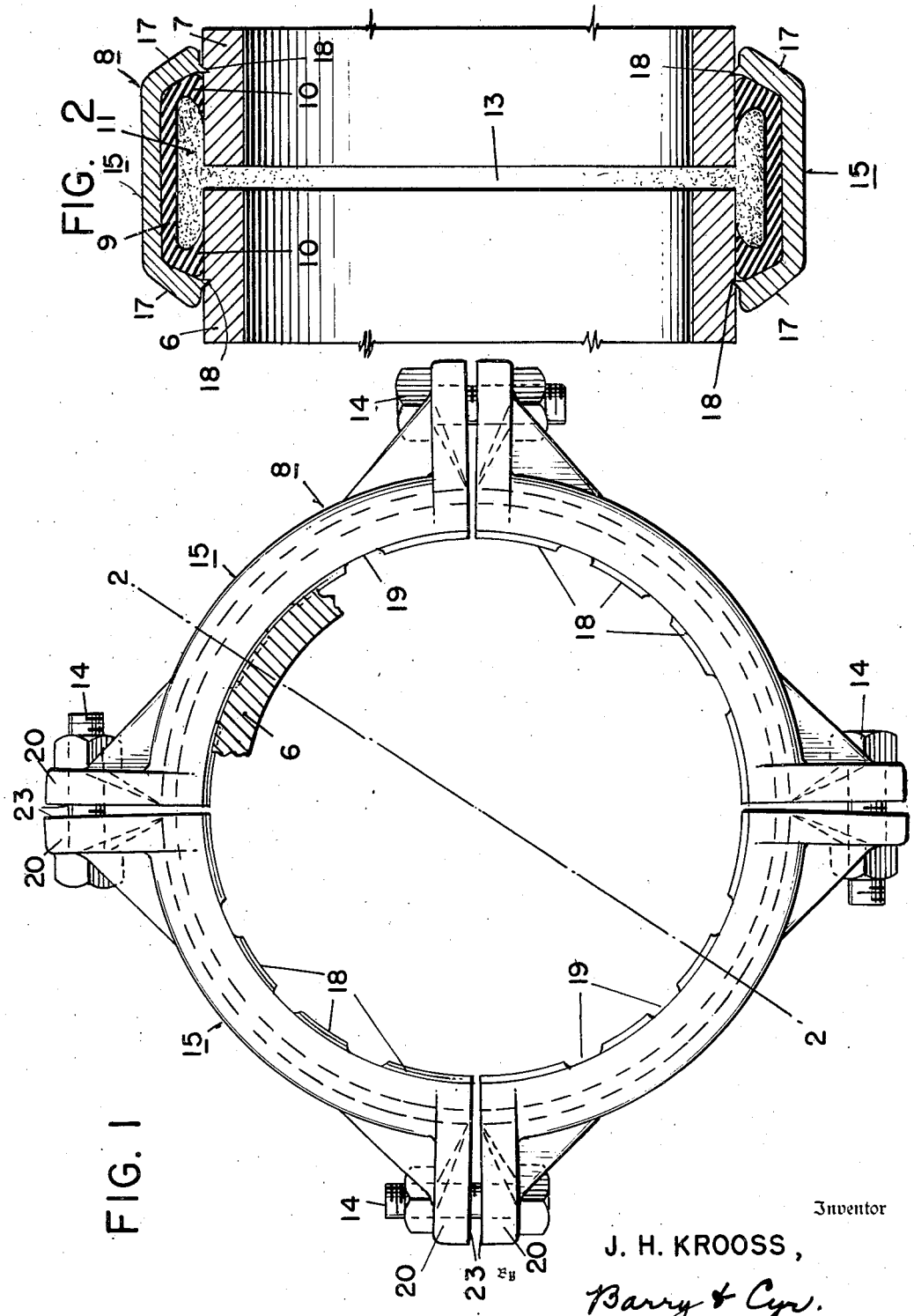
Inventor
J. H. KROOSS,
Barry & Cyr.
Attorneys

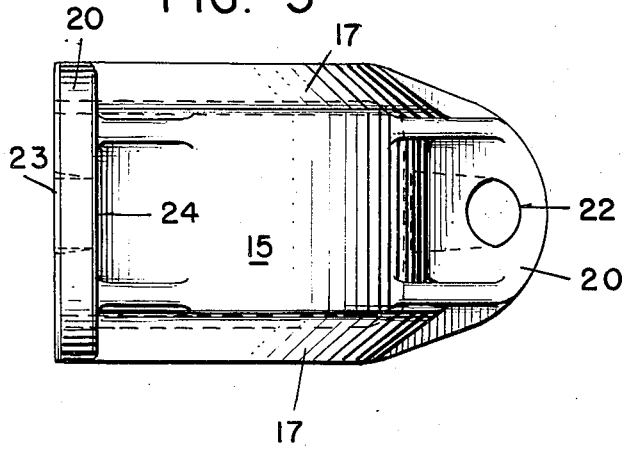
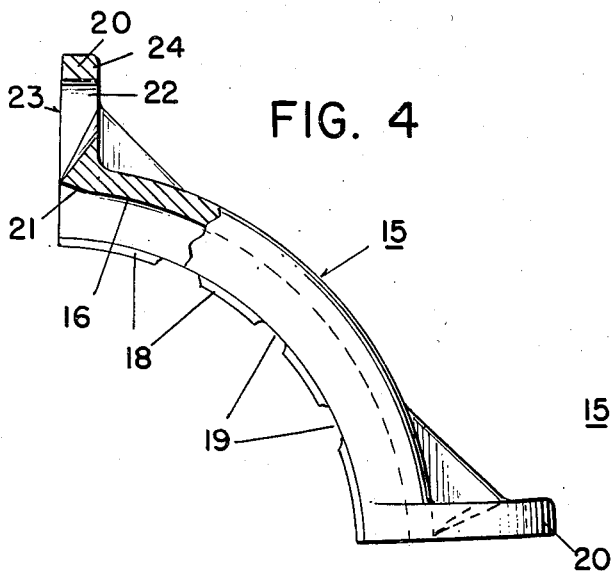
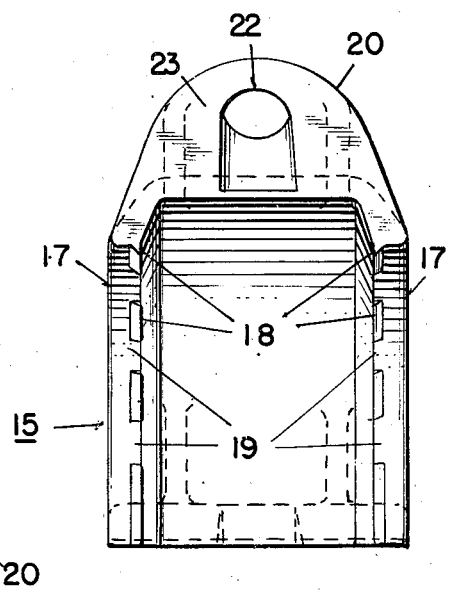

Patented June 14, 1949

2,473,102

UNITED STATES PATENT OFFICE 2,473,102

COUPLING FOR BRITTLE PIPES

John H. Krooss, New York, N. Y., assignor to Victaulic Company of America, New York, N. Y., a corporation of New Jersey Application February 6, 1947, Serial No. 726,889

1 Claim. (Cl. 285—194)

This invention relates to pipe couplings and and more particularly to a novel coupling for use with pipes of brittle materials, asbestos-cement, for example. It is essential in coupling pipes of such materials to apply radial forces as uniformly as possible, and one of the objects of the present invention is to provide a coupling having a segmental housing capable of providing uniform radial pressure on the external surfaces of the pipes to prevent pipe distortion that may cause fracture.

Another object is to insure leak-tightness of the joint by the use of a gasket of recumbent C-shape cross-section and to use such gasket in combination with a novel housing so that the coupling not only incorporates a friction grip on the pipe due to compression of the gasket against the same, but in addition, incorporates a positive tooth grip on the pipe to insure a positive grip even in the presence of a moist pipe surface which renders the ordinary friction grip ineffective.

A further object is to supply a coupling housing of four segment construction to facilitate assembly and disassembly, in that, the housing can be treated as a flexible chain of linked segments, permitting the housing to be wrapped around the pipe and then locked by a single bolt connection, followed by uniform tightening of the assembled linkage.

With the foregoing in mind, the invention will be fully understood from the description and claim when the same are read in connection with the drawings, accompanying and forming part of this specification, in which:

Fig. 1 is an end elevation of the coupling and a portion of a pipe arranged within the same.

Fig. 2 is a diametrical section on the line 2—2 of Fig. 1 with the coupling applied to adjacent ends of pipes.

Fig. 3 is a top plan view of one of the segments of the housing.

Fig. 4 is a side elevation of the same, partially broken away and in section.

Fig. 5 is a front elevation of the segment.

Referring to the drawings, 6 and 7 designate pipes of brittle material such as asbestos-cement. In accordance with the invention, adjacent ends of the pipes are connected together by housing 8 in which a gasket 9 of rubber-like material is arranged. Such gasket is preferably of recumbent C-shape in diametrical section so that the lips 10 thereof will frictionally engage the outer surfaces of the pipes and be pressed thereon by pressure of the fluid in the pipe line entering the cavity 11 of the gasket through the space 13 between the pipe ends.

The housing 8 is formed of resilient metal or the like and it preferably consists of four segments connected together by bolts 14.

In accordance with the invention, each segment is of arcuate shape circumferentially, as indicated at 15, and provided with a circumferential groove 16 for the reception of the gasket. Diverging lips 17 at opposite side of the groove terminate at the inner edges of the segment in buttress-type teeth 18 which are spaced circumferentially, as indicated at 19.

In use, the four-part housing provides uniform radial pressure on the outside of the pipe and prevents pipe distortion that may cause fracture.

The engagement of the housing with the pipe surface is accomplished by means of the interrupted buttress-type teeth 18, and the spaces 19 between them permit bending of the housing to provide uniform contact between the teeth and circumference of the pipe. This uniform contact in turn provides uniform radial loading.

As the lugs 20 are relatively thin and the surface 23 converges outwardly relatively to the inner surface 24, the lugs will deflect under high bolt tension and limit the radial pressure on the pipe to a safe value.

The leak-tightness of the joint is insured through the principal of the C-shape cross-section gasket. As before stated, my coupling not only incorporates a friction grip due to the compression of the gasket against the pipe walls, but also incorporates positive tooth grip to safeguard and insure a positive grip even if the outer surfaces of the pipe are wet.

If one bolt is removed and one lug 20 is suspended from the hand, it may be seen that the segments will pivot about the remaining bolts and the remaining bolts will function as links between adjacent segments so that the housing can be treated as a flexible chain, allowing it to be wrapped around the pipe into proper position, and then locked by the single bolt previously removed. After locking, uniform pressure can be obtained by tightening the various bolts.

From the foregoing, it is believed that the construction, use and advantages of my improved coupling may be readily understood, and I am aware that changes may be made in the details disclosed, without departing from the spirit of the invention, as expressed in the following claim:

What I claim and desire to secure by Letters Patent is:

A coupling for two frangible pipes having ungrooved smooth cylindrical exterior surfaces arranged with the ends adjacent each other comprising, a housing formed of more than two arcuate-shaped segments each being resilient to lengthwise bending, means for drawing the ends of the housing segments towards each other and clamping the segments around the ends of said pipes, a pair of inwardly projecting axially spaced lips carried by each segment providing a circumferentially extending groove within the housing, circumferentially spaced teeth carried by the inner edges of said lips for engaging the exterior surfaces of said pipes, and each of said teeth at its free end having a greater dimension measured circumferentially than the dimensions of the teeth measured axially of the coupling.

JOHN H. KROOSS.

REFERENCES CITED

The following references are of record in the file of this patent:

UNITED STATES PATENTS

| Number | Name | Date |
| --- | --- | --- |
| 1,197,813 | Frilick | Sept. 12, 1916 |
| 1,978,453 | Flynn | Oct. 30, 1934 |
| 2,249,848 | O'Brien | July 22, 1948 |